United States Patent [19]

Arcuri

[11] Patent Number: 5,115,450
[45] Date of Patent: May 19, 1992

[54] HIGH SPEED DIGITAL TO ANALOG TO DIGITAL COMMUNICATION SYSTEM

[75] Inventor: Salvatore Arcuri, Dublin, Calif.

[73] Assignee: Advanced Micro Devices, Inc., Sunnyvale, Calif.

[21] Appl. No.: 376,882

[22] Filed: Jul. 6, 1989

[51] Int. Cl.[5] .............................................. H04J 3/02
[52] U.S. Cl. .................................. 375/7; 375/17; 375/24; 375/98; 370/37; 370/77; 370/112; 370/114
[58] Field of Search ...................... 375/17, 24, 25, 37, 375/7, 8, 98; 370/41, 77, 114, 112, 37; 332/103, 106, 115; 341/126, 141, 144, 153; 358/13, 148, 176, 178; 455/600, 608

[56] References Cited

U.S. PATENT DOCUMENTS

| | | | |
|---|---|---|---|
| 3,337,691 | 8/1967 | Litchman | 370/112 |
| 3,559,067 | 1/1971 | Genest et al. | 375/17 |
| 3,569,615 | 3/1971 | Oberbeck | 375/24 |
| 3,815,109 | 6/1974 | Carraway et al. | 375/24 |
| 3,832,494 | 8/1974 | Seim et al. | 370/112 |
| 3,870,828 | 3/1975 | Saliga | 370/112 |
| 3,979,561 | 9/1976 | Hinkle et al. | 370/114 |
| 4,347,619 | 8/1982 | Dakin et al. | 375/37 |
| 4,404,532 | 9/1983 | Welti | 332/103 |
| 4,473,901 | 9/1984 | Jensen | 375/24 |
| 4,511,862 | 4/1985 | Motiwala et al. | 332/103 |
| 4,812,786 | 3/1989 | Davarian et al. | 332/103 |
| 4,899,367 | 6/1990 | Sampei | 375/39 |
| 4,903,125 | 2/1990 | Parker | 375/38 |

FOREIGN PATENT DOCUMENTS 0053230 9/1982 European Pat. Off. .
2714153 7/1978 Fed. Rep. of Germany .

OTHER PUBLICATIONS

Vesuna et al., *Digital Video Data Can Now Travel by Taxi,* System Design/Integrated Circuits, copyright Computer Design Publishing Company, Feb. 1987.
Friend et al., *Understanding Data Communications,* Howard W. Sams and Company (1984), p. 83.

Primary Examiner—Benedict V. Safourek
Attorney, Agent, or Firm—Fliesler, Dubb, Meyer & Lovejoy

[57] ABSTRACT

High speed communication of digital information is accomplished using an analog transmission format. A transmitter receiving digital data in parallel multi-bit words converts digital words in conversion clock cycles to a single analog signal relative to a DC level. The transmitter also includes a reference pulse generator which combines a reference pulse with the analog levels generated by the converter to form an analog output for transmission to the receiver. The receiver includes a detector receiving the analog output. In response to the reference pulse, the receiver generates a recovery clock. A flash analog-to-digital converter converts the analog levels in the analog output to multi-bit digital outputs. The parallel multi-bit words are regenerated in recovery clock cycles from sampling the multi-bit digital output once per cycle. Thus, by using a digital to analog to digital system, effective bit rates are achieved that are higher than the switching speeds of the transmitter and receiver.

27 Claims, 4 Drawing Sheets

PULSE AMPLITUDE MODULATION

PRIOR ART
FIG.-1a

PULSE WIDTH MODULATION

PRIOR ART
FIG.-1b

PULSE POSITION MODULATION

HIGH SPEED DIGITAL TO ANALOG TO DIGITAL COMMUNICATION SYSTEM

BACKGROUND OF THE INVENTION

1 Field of the Invention

The present invention relates to high speed communications systems for digital data; and, more particularly, provides a data communications systems relying on analog signals for transmission of digital data.

2. Description of Related Art

High speed communications are required for a growing number of applications. The amount of data that can be transmitted per unit time has been limited by the switching speed of components in the transmitters and receivers. Further, for data integrity it has been the practice to use digital communication signals that include one bit of information per cycle.

Figure 1A:
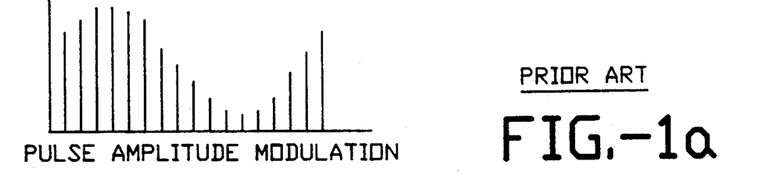
FIGS. 1a-1c are figures illustrating prior art quasi-analog communication signal formats, including pulse amplitude modulation, pulse width modulation, and pulse position modulation from Friend, et al., *Understanding Data Communications*, Howard W. Sams and Company (1984) p. 83.
Figure 1B:
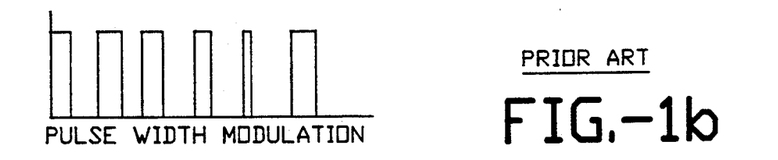
Figure 1C:
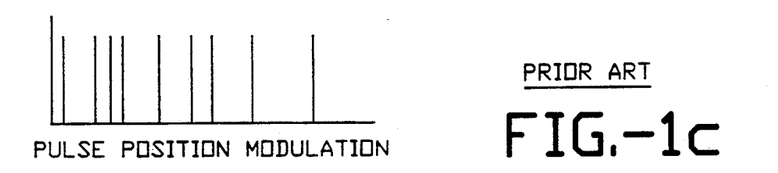

It is known that a multi-level signal, such as the quasi-analog pulse amplitude modulation scheme (PAM) shown in FIG. 1a, contains more information per pulse than a pure digital signal. More information per pulse means more information per cycle in the transmitted signal and a higher effective data rate at a given frequency. Alternative quasi-analog systems shown in FIGS. 1b and 1c, respectively, are pulse width modulation and pulse position modulation. These quasi-analog communication signal formats have been used for the purposes of sampling analog data, such as voice in a telephone system, and converting it to a format for communication.

For long distance communications, these three quasi-analog communication signals have been converted to a purely digital format, such as pulse code modulation, to overcome noise interference problems and the like. Once in a purely digital format, the data can be combined with other kinds of digital data for high speed - long distance communication.

The limitation in switching speed of integrated circuit components begins to limit the speed of transmission of data in a digital format in current high volume data transmission systems. Such rapid communication applications are growing and include, in addition to telecommunications, video teleconferencing, digital video image transmission, and the like. Thus, it is desirable to increase the effective data rate of a transmission system having a given switching speed limitation.

SUMMARY OF THE INVENTION

The present invention provides a true analog signal, in combination with reference pulses, for high speed communication of digital information. According to the invention, a transmitter receives digital information in parallel multi-bit words at a switching speed, and converts the multi-bit words to pulses with corresponding analog levels at that same switching speed. The analog levels are transmitted as an analog signal across a communication link. A receiver connected to the link recovers the digital information from the analog signal. Because each pulse of the analog signal encodes a plurality of bits of data in parallel, communication at a higher effective bit rate is achieved at a given switching speed.

According to one aspect of the present invention, an apparatus is provided for communication of digital data. The apparatus comprises a transmitter receiving digital data in parallel multi-bit words. The parallel multi-bit words are converted in conversion clock cycles to corresponding analog levels relative to a DC level. In each conversion clock cycle, the analog level does not return to zero unless a following multi-bit word encodes the zero level. The transmitter also includes a reference pulse generator which combines a periodic reference pulse with the analog levels generated by the converter to form an analog output for transmission to the receiver.

The receiver includes a detector receiving the analog output. In response to the reference pulse, the receiver generates a recovery clock. A flash analog-to-digital converter asynchronously converts the analog levels in the analog output to multi-bit digital outputs. The parallel multi-bit words are regenerated in recovery clock cycles by sampling the multi-bit digital output once per cycle.

Further aspects and advantages of the present invention will be determined upon review of the figures, the detailed description and the claims which follow.

DETAILED DESCRIPTION

A detailed description of preferred embodiments of the present invention is provided with reference to the figures.

Figure 2:
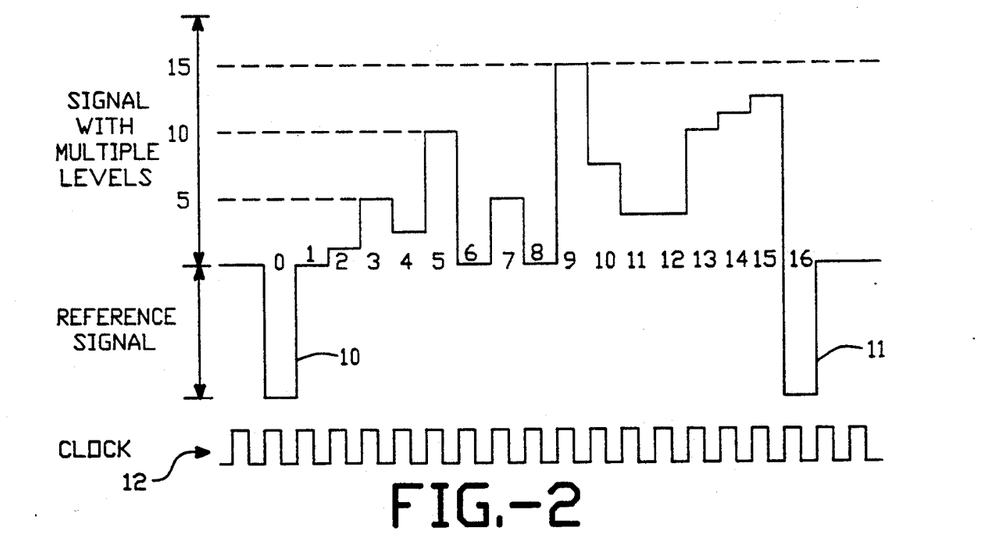
FIG. 2 is an illustration of the analog communication signal format according to the present invention.
Figure 3:
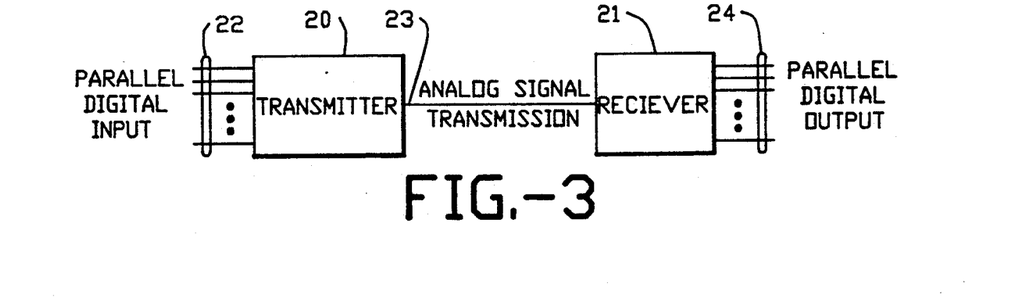
FIG. 3 is a block diagram of a communication system according to the present invention.
Figure 4:
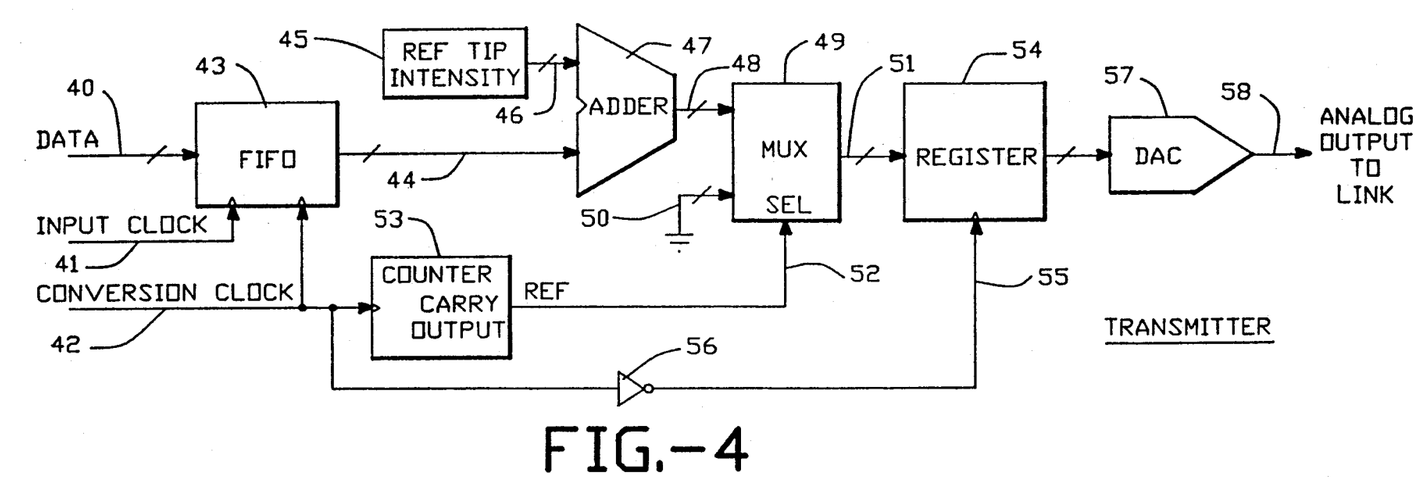
FIG. 4 is a block diagram of a first embodiment of a transmitter according to the present invention.
Figure 5:
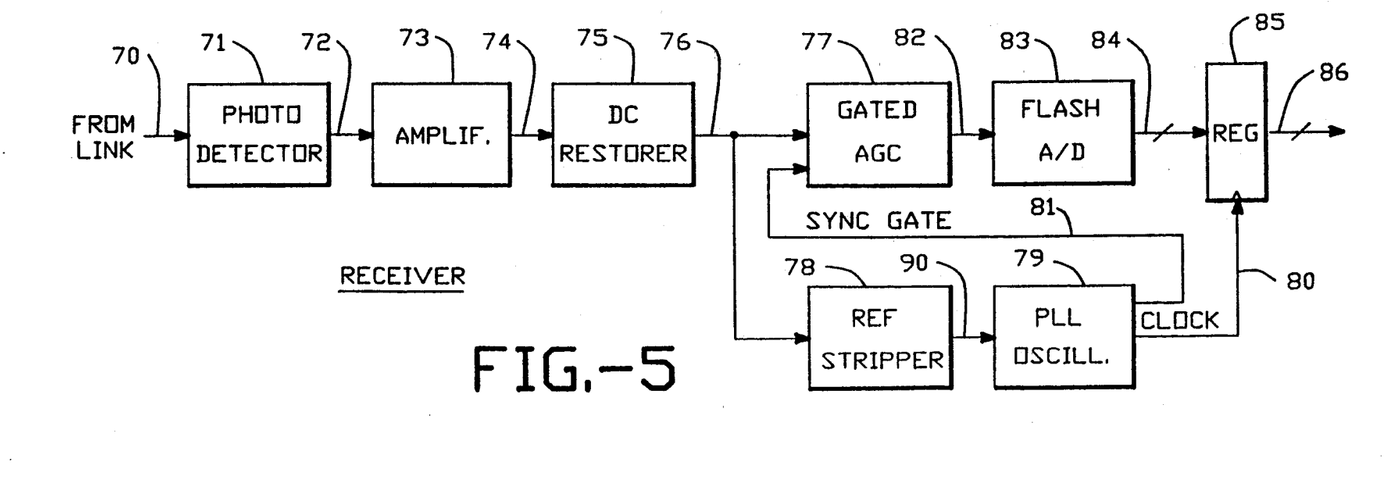
FIG. 5 is a block diagram of a receiver according to the present invention.
Figure 6:
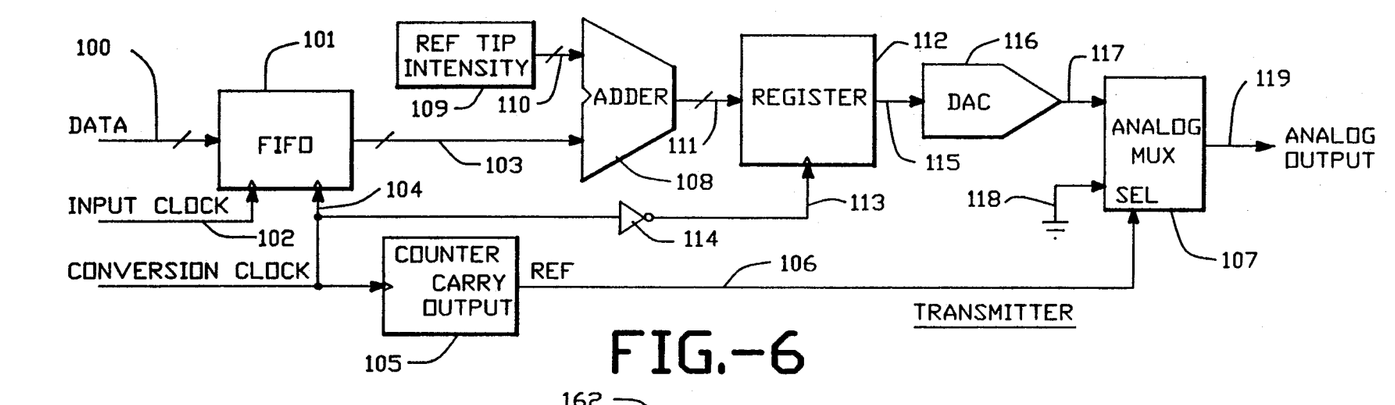
FIG. 6 is a block diagram of an alternative embodiment of a transmitter according to the present invention.
Figure 7:
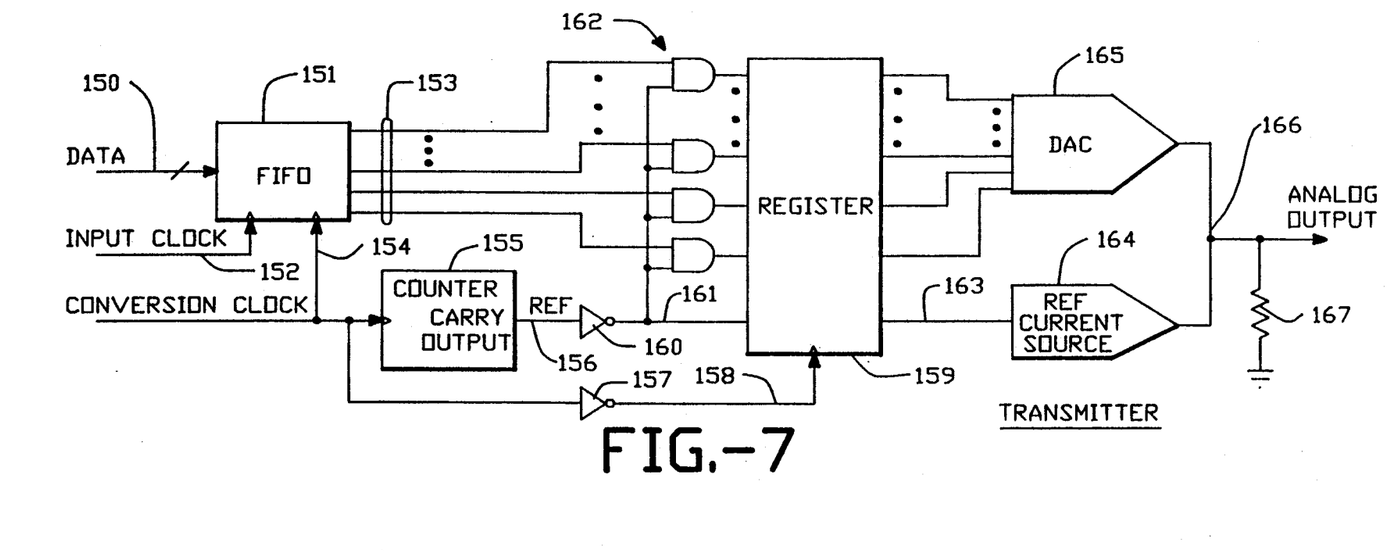
FIG. 7 is a block diagram of yet a third alternative of a transmitter according to the present invention.
Figure 8:
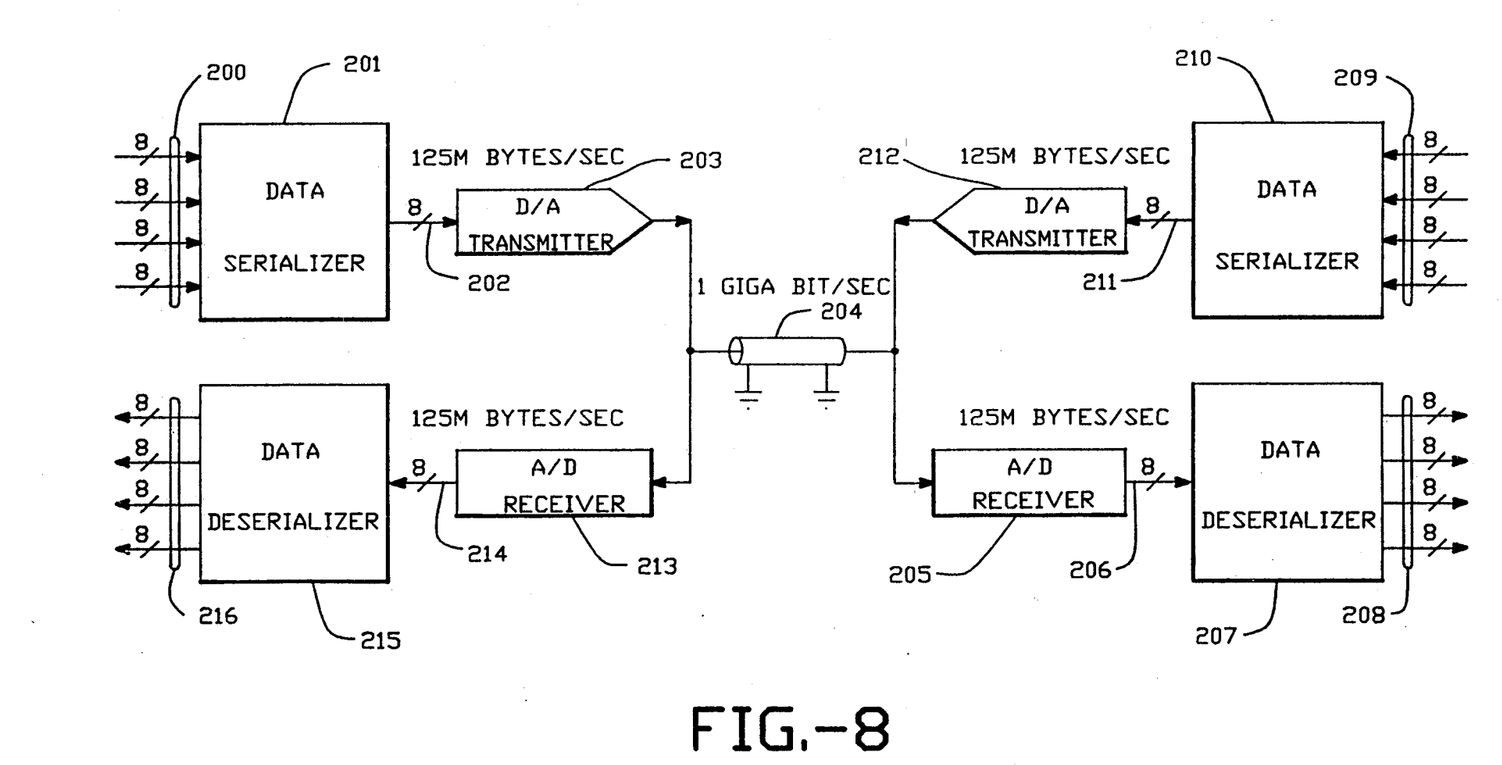
FIG. 8 is a block diagram of a high effective data rate digital to analog to digital transmission system according to the present invention.

With reference to FIGS. 2 and 3, an overview of a digital-to-analog-to-digital transmission system is provided. With reference to FIGS. 4 and 5, a representative transmitter and receiver system is described. With reference to FIGS. 6 and 7, alternative transmitter embodiments are set out. FIG. 8 illustrates a high data rate transmission system according to the present invention.

FIG. 2 shows an example of an analog signal suitable for transmission of digital information according to the present invention. The analog signal consists of reference signals 10, 11 generated in response to a conversion clock signal 12. The reference signals 10, 11 are generated in cycles 0 and 16 of the conversion clock 12. In each intervening cycle, an analog level representing a value of a parallel digital input word is transmitted. For example, in cycle 1, a level corresponding to the first word, e.g., level 0 is transmitted. In cycle 2, level 1 for the second word is transmitted, in cycle 3, level 5 for the third word is transmitted, and so on where cycle 9, level 14 for the ninth word is transmitted, cycle 16, level 0 for the sixteenth word is transmitted. Note that the level of the analog signal does not return to 0 in each cycle of the conversion clock 12. Note also that there are 16 possible levels for the analog signal corresponding to a 4-bit, parallel input digital word.

FIG. 3 provides a block diagram of the digital-to-analog-to-digital transmission system according to the present invention. The system includes a transmitter 20 and a receiver 21. The transmitter receives parallel digital input 22 made up of a plurality of streams of digital data, converts the parallel digital input 22 to an analog signal for transmission across link 23. The analog signal is received by the receiver 21 and converted to parallel digital output 24. The parallel digital output is a regeneration of the sequence of digital words received at the parallel digital input 22.

FIG. 4 is a block diagram of a transmitter according to a preferred embodiment of the present invention. Inputs to the transmitter include parallel multi-bit words on data line 40, an input clock on line 41 and a conversion clock on line 42. A FIFO 43 receives the data 40 in response to the input clock 41. Digital words are output by the FIFO on line 44 in response to the conversion clock 42. A reference pulse tip intensity constant is stored in register 45. This constant is supplied on lines 46. A digital adder 47 receives the reference tip intensity constant on line 46 and the digital input word on line 44 and generates the sum for supply on line 48. The signals on lines 48 are digital multi-bit words representing the incoming data and the reference pulse.

The digital data on line 48 is supplied as a first input to multiplexer 49. The second input to multiplexer 49 is a reference value, in this case ground, on line 50.

The output of the multiplexer 49 is supplied on line 51. The signal on line 51 is the digital data on line 48 combined with a reference value from line 50 as determined by the reference signal on line 52. The reference signal is generated by a multi-bit counter 53 which counts the conversion clock cycles. For a reference signal generation every 16 cycles, the counter would be a 4-bit counter using the carry output as the reference pulse. The output of the multiplexer 51 is stored in register 54 in response to the inverse of the conversion clock on line 55. The inverse is generated by inverter 56 which is connected to receive the conversion clock on line 42. The output of register 54 is supplied to a digital-to-analog converter 57. The output of the digital-to-analog converter is the analog signal in the form as illustrated in FIG. 2 on line 58. This signal is suitable for transmission to a receiver across a communication link, such as a fiber-optic line.

FIG. 5 illustrates a receiver for a fiber-optic transmission system according to the present invention. The receiver receives the analog signal on line 70. The analog signal is supplied to photodetector 71 which generates an analog electrical signal on line 72 in response to the input signal on line 70. This signal is supplied through amplifier 73 across line 74 to a DC restoring circuit 75, which is responsive to the reference pulse for establishing a reconstituted version of the analog output signal on line 76 in a form as shown in FIG. 2. This signal on line 76 is supplied to a gated automatic gain control circuit 77, which normalizes the analog levels with reference to the reference pulse, and to a reference pulse stripping circuit 78. The reference stripping circuit 78 supplies the reference pulse across line 90 to a phase-locked loop oscillator 79 which generates a recovery clock on line 80. In addition, PLL 79 generates a sync gate signal on line 81.

The sync gate signal on line 81 is supplied as a gate control input to the gated automatic gain control circuit 77. The output of the automatic gain control circuit on line 82 is supplied to a flash analog-to-digital converter 83. This supplies a digital output on line 84 which is sampled by register 85 in response to the recovery clock on line 80. The output on line 86 of register 85 is the regenerated sequence of multi-bit digital words.

FIG. 6 describes an alternative embodiment of a transmitter according to the present invention using a digital adder with an analog multiplexer. In this system, the parallel data is received on line 100 by a FIFO 101 in response to input clock 102. The FIFO 10 supplies the sequence of digital multi-bit words on line 103 in response to conversion clock on line 104. The conversion clock is supplied to counter 105 which generates a reference signal on line 106 used to control analog multiplexer 107. The output of the FIFO 101 on line 103 is supplied to digital adder 108 where it is combined with the constant supplied by the reference tip intensity register 109 across line 110. The output of the adder on line 111 is sampled by register 112 in response to the inverse of the conversion clock on line 113. The inverse of the conversion clock on line 113 is generated by inverter 114 which is connected to receive the conversion clock on line 104. The output of register 112 is supplied on line 115 to digital-to-analog converter 116. The analog output on line 117 of the digital-to-analog converter 116 is supplied as a first input to analog multiplexer 107. The second input to the analog multiplexer 107 is a reference value, in this case ground, on line 118. The output of the multiplexer is an analog signal as illustrated in FIG. 2 on line 119.

FIG. 7 is yet another alternative of a transmitter according to the present invention using a digital mask and an analog adder. In the embodiment of FIG. 7, the sequence of digital multi-bit words is supplied on line 150 to FIFO 151 in response to the input clock on line 152. The output of the FIFO is supplied on lines 153 in response to the conversion clock on line 154.

The conversion clock is supplied to a reference counter 155 which generates a reference signal on line 156. Likewise, the conversion clock is supplied through inverter 157 as a clock input on line 158 to register 159. The reference signal on line 156 is supplied through inverter 160 to line 161 as an input to register 159. Likewise, digital mask gates 162 consisting of a sequence of AND-gates each receive the signal on line 161 as a mask input. The second input to each mask gate 162 is one bit of a multi-bit word in the sequence supplied on lines 153. Register 159 latches the output of the mask gates 162 and the signal on line 161. The lowermost bit in register 159 is supplied on line 163 as input to the reference current source 164. The remaining bits in register 159 are supplied as digital inputs to digital-to-analog converter 165. The output of the reference current source and the digital-to-analog converter are combined on line 166 to form the analog output in a form as shown in FIG. 2. A load resistor 167 is coupled from line 166 to ground.

When the reference signal on line 156 is inactive, the value of the reference current source is added with the digital-to-analog converter output current to form the analog signal. When the reference signal on line 156 is active, the digital data supplied as inputs to the digital-to-analog converter 165 are zeros and the reference current source 164 is disabled, resulting in a reference pulse as shown in FIG. 2.

FIG. 8 is a schematic diagram of a communication system capable of transmitting one gigabit per second according to the present invention. In this system, four 8-bit parallel streams on lines 200 are supplied to data serializer 201 which generates eight 125 Megabits/sec. serial streams on line 202 for a total rate of 125 Megabytes/sec. These serial streams are supplied to digital-to-analog transmitter 203 for generation of an analog signal for communication across fiber-optic or coaxial link 204 at an effective bit rate of 1 gigabit per second. On the receiving end of the communication link 204, is an analog-to-digital receiver 205 which regenerates the eight serial streams on lines 206. The data deserializer 207 takes each of the eight serial streams from lines 206 and regenerates four 8-bit parallel streams on lines 208.

The system includes means for transmitting in both directions. Accordingly, four 8-bit parallel streams on lines 209 are supplied to data serializer 210 which generates eight serial streams on lines 211, at a total of 125 Megabytes per second. A digital-to-analog transmitter 212 generates an analog signal for transmission at gigabit/sec. across communication link 204. Analog-to-digital receiver 213 receives the signal and reconstitutes the eight serial streams on line 214. The eight serial streams are supplied to data deserializer 215 which reconstitutes the four 8-bit parallel streams on lines 216.

Accordingly, the system of FIG. 8 provides a communication system which allows up to 1 gigabit per second over coaxial cables or fiber-optic communication lines using integrated circuit analog to digital converters operating at 125 MegaHertz. The digital data rate is thus eight times faster than that available using standard digital switching elements at 125 MegaHertz. The bottleneck represented by digital line drivers and receivers is therefore solved using parallel digital-to-analog and analog-to-parallel digital converters. Even higher effective data rates, for the given switching speed can be achieved with digital words larger than 8 bits as input, subject to any limitation caused by noise levels in the signal.

In alternative systems, a phase modulation technique could be used in combination with the amplitude modulation set out in FIG. 2 to obtain better noise immunity and the like in modems.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

I claim:

1. An apparatus for communication of digital data across a communication link, comprising:

means for supplying a plurality of streams of digital data in parallel, the means for supplying including,
   means, receiving a plurality of sequences of multibit words, for combining the plurality of sequences into a set of serial bit streams, wherein each sequence of multibit words is received at a rate of at least 31.25 Megawords per second and each serial bit stream has a rate of at least 125 Megabits per second, and
   means for sampling the set of serial bit streams to form the plurality of streams of digital data;

means, connected to the means for supplying the plurality of streams of digital data, for converting the plurality of streams of digital data to a single analog signal at a rate such that the means for converting has an effective throughput of at least 125 Megawords per second;

means, connected to the means for converting and the communication link, for transmitting the analog signal across the communication link; and means, connected to the communication link, for recovering the plurality of streams of digital data from the analog signal.

2. The apparatus of claim 1, wherein the means for recovering includes:

means for sampling the analog signal to reconstitute the set of serial bit streams; and means, connected to the means for sampling the analog signal, for recombining the set of serial bit streams to reconstitute the plurality of sequences of multibit words.

3. An apparatus for communication of digital data across a communication link, comprising:

means for supplying a plurality of streams of digital data in parallel;

means, connected to the means for supplying the digital data, and receiving a conversion clock signal having clock cycles, for converting the plurality of streams to a sequence of analog levels, one analog lever per clock cycle of the conversion clock signal;

means, receiving the conversion clock signal, for periodically generating a sequence of reference pulses, one for every N clock cycles of the conversion clock signal, where N is a prespecified integer greater than 1;

means, connected to the means for converting and the means for periodically generating, for combining the sequence of analog levels and the sequence of reference pulses to form an analog output for transmission on the link;

means, connected to the link, for receiving the analog output;

means, coupled to the means for receiving the analog output, for generating a recovery clock in response to the reference pulses;

means, coupled to the means for receiving the analog output, for converting the analog output to a multibit digital output; and means, responsive to the recovery clock and receiving the multibit digital output, for regenerating the plurality of streams of digital data.

4. The apparatus of claim 3, wherein the means for converting includes:

means, responsive to the reference pulse, for normalizing the analog levels in the analog output; and means for stripping the reference pulse from the analog output.

5. The apparatus of claim 3, wherein the means for supplying includes:

means, receiving a plurality of sequences of multibit words, for combining the plurality of sequences into a set of serial bit streams; and means for sampling the set of serial bit streams to form the plurality of streams of digital data.

6. The apparatus of claim 5 further including:
means, connected to the means for regenerating, for recombining the plurality of streams to reconstitute the plurality of sequences of multibit words.

7. An apparatus for communication of digital data across a communication link, comprising:
means for supplying a plurality of streams of digital data in parallel;
means, receiving a conversion clock signal having clock cycles, for generating a sequence of reference words, one for every N clock cycles of the conversion clock signal, where N is a prespecified integer greater than 1;
means for combining the plurality of streams and the sequence of reference words to form a sequence of digital outputs;
means, connected to the means for combining and receiving the conversion clock signal, for converting the sequence of digital outputs to analog levels representing the plurality of streams and to reference pulses representing the sequence of reference words, in clock cycles of the conversion clock signal and supplying the analog levels as an analog output for transmission on the link;
means, connected to the link, for receiving the analog output;
means, coupled to the means for receiving the analog output, for generating a recovery clock in response to the reference pulses;
means, coupled to the means for receiving the analog output, for converting the analog output to a multibit digital output; and
means, responsive to the recovery clock and receiving the multibit digital output, for regenerating the plurality of streams.

8. The apparatus of claim 7, wherein the means for converting includes:
means, responsive to the reference pulses, for normalizing the analog levels in the analog output; and
means for stripping the reference pulses from the analog output.

9. The apparatus of claim 7, wherein the digital data includes a plurality of sequences a multibit words, and the means for supplying includes:
means, receiving the plurality of sequences of multibit words, for combining the plurality of sequences into a set of serial bit streams; and
means for sampling the set of serial bit streams to form the plurality of streams of digital data.

10. The apparatus of claim 7, wherein the digital data includes a plurality of sequences of multibit words, and the means for supplying includes:
means, receiving the plurality of sequences of multibit words, for combining the plurality of sequences into a set of serial bit streams; and
means for sampling the set of serial bit streams to form the plurality of streams of digital data; the apparatus further including:
means, connected to the means for regenerating, for recombining the plurality of streams to form the plurality of sequences of multibit words.

11. An apparatus for communication of digital data on a communication link, comprising:
a transmitter including
means for receiving digital data in parallel multibit words;
means, connected to the means for receiving digital data, and receiving a conversion clock signal having clock cycles, for converting the multibit words to corresponding analog levels in clock cycles of the conversion clock signal;
means, receiving the conversion clock signal, for periodically generating a reference pulse for every N clock cycles of the conversion clock signal, where N is a prespecified integer greater than 1; and
means, connected to the link, the means for converting and the means periodically generating, for combining the analog levels and the reference pulses to form an analog output for transmission on the link; and a receiver including:
means, connected to the link, for receiving the analog output;
means, coupled to the means for receiving the analog output, for generating a recovery clock in response to the reference pulses;
means, coupled to the means for receiving the analog output and responsive to the reference pulses, for normalizing the analog levels in the analog output to generate a normalized signal;
means, connected to the means for normalizing, for stripping the reference pulses from the normalized signal;
means, connected to the means for stripping, for converting the normalized signal to a multibit digital output; and
means, responsive to the recovery clock and receiving the multibit digital output, for regenerating the parallel multibit words.

12. An apparatus for communication of digital data on a communication link, the apparatus comprising:
a transmitter including,
means for receiving digital data in parallel multibit words,
means, receiving a conversion clock signal having clock cycles, for periodically generating a reference word for every N clock cycles of the conversion clock signal, where N is a prespecified integer,
means for combining the multibit words and the reference words to form a sequence of digital outputs, and
means, connected to the means for combining and receiving the conversion clock signal, for converting the sequence of digital outputs to analog levels representing the multibit words and to reference pulses representing reference words, in clock cycles of the conversion clock signal and supplying the analog levels as an analog output for transmission on the link; and
a receiver including,
means, connected to the link, for receiving the analog output,
means, coupled to the means for receiving the analog output, for generating a recovery clock in response t the reference pulses,
means, coupled to the means for receiving the analog output and responsive to the reference pulses, for normalizing the analog levels in the analog output to generate a normalized signal,
means, connected to the means for normalizing, for stripping the reference pulses from the normalized signal, means, connected to the means for stripping, for converting the normalized signal to a multibit digital output, and means, responsive to the recovery clock and receiving the multibit digital output, for regenerating the parallel multibit words.

13. An apparatus for communication of digital data across a communication link, the apparatus comprising:

means for supplying a plurality of streams of digital data in parallel at a switching speed, the means for supplying including, i) means, receiving a plurality of sequence of multibit words, for combining the plurality of sequences into a set of serial bit streams, and ii) means for sampling the set of serial bit streams to form the plurality of streams of digital data;

means, connected to the means for supplying the plurality of streams of digital data, for converting the plurality of streams of digital data to a single analog signal at the switching speed;

means, connected to the means for converting and the communication link, for transmitting the analog signal across the communication link; and means, connected to the communication link, for recovering the plurality of streams of digital data from the analog signal.

14. The apparatus of claim 13 wherein the means for recovering comprises:

means for sampling the analog signal to reconstitute the set of serial bit streams; and means, connected to the means for sampling the analog signal, for recombining the set of serial bit streams to reconstitute the plurality of sequences of multibit words.

15. An apparatus couplable to receive a first plurality of N-bit input streams of digital data from respective sources, each of the first plurality of N-bit input streams including a series of N-bit words, wherein the apparatus is couplable to an analog communication link, and the apparatus comprises:

serializer means (201 or 210) for receiving the first plurality of N-bit input streams in parallel and for serializing the first plurality of N-bit streams into a first N-bit stream in a time-multiplexing manner such that N-bit words from respective N-bit streams of the first plurality of N-bit streams are sequentially inserted into the first N-bit stream; and transmitter means (203 or 212), coupled to the serializer means, for converting the first N-bit stream into a first analog stream, and for transmitting the first analog stream onto the analog communication link.

16. The apparatus of claim 15 wherein the transmitter means (FIG. 4) comprises:

means (46, 47), coupled to the serializer means, for applying an intensity reference to each N-bit word in the first N-bit stream;

means (49, 53), coupled to the means for applying, for inserting N-bit reference words into the first N-bit stream; and means (57), coupled to the means for inserting, for sequentially converting each N-bit word and reference word in the first N-bit stream into an analog output level for transmission onto the analog communication link.

17. The apparatus of claim 15, further couplable to provide a second plurality of N-bit output streams of digital data to respective destinations, each of the second plurality of N-bit output streams including a series of N-bit words, wherein the apparatus further comprises:

receiver means (213 or 205) for receiving a second analog stream from the analog communication link, and for converting the second analog stream into a second N-bit stream; and deserializer means (215 or 207), coupled to the receiver means, for deserializing the second N-bit stream into the second plurality of N-bit output streams of digital data in a time-demultiplexing manner such that N-bit words are sequentially extracted from the second N-bit stream, and for providing the second plurality of N-bit output streams in parallel.

18. The apparatus of claim 17 wherein the second analog stream includes analog reference level data, and wherein the receiver means comprises:

means (78, 79) for obtaining a reference clock from the analog reference level data in the second analog stream;

means (75, 77), coupled to the means for obtaining and to receive the second analog stream, for normalizing the second analog stream according to the analog reference level data, and for removing the analog reference level data from the second analog stream; and means (83), coupled to the means for normalizing, for converting the second analog stream, without the analog reference level data, into the second N-bit stream.

19. The apparatus of claim 17 wherein:

the transmitter means comprises, means (46, 47), coupled to the serializer means, for applying an intensity reference to each N-bit word in the first N-bit stream, means (49, 53), coupled to the means for applying, for inserting N-bit reference words into the first N-bit stream, and means (57), coupled to the means for inserting, for sequentially converting each N-bit word and reference word in the first N-bit stream into an analog output signal for transmission onto the analog communication link, the analog output signal including analog reference level data representing the N-bit reference words; and the receiver means comprises, means (78, 79) for obtaining a reference clock from the analog reference level data in the second analog stream, means (75, 77), coupled to the means for obtaining and to receive the second analog stream, for normalizing the second analog stream according to the analog reference level data, and for removing the analog reference level data from the second analog stream, and means (83), coupled to the means for normalizing, for converting the second analog stream, without the analog reference level data, into the second N-bit stream.

20. The apparatus of claim 15 wherein the transmitter means (FIG. 6) comprises:

means (109, 108), coupled to the serializer means, for applying an intensity reference to each N-bit word in the first N-bit stream;

means (116), coupled to the means for applying, for sequentially converting each N-bit word in the first N-bit stream into an analog output level, to generate an analog output stream; and means (107, 105), coupled to the means for sequentially converting, for inserting analog reference level data into the analog output stream, for transmission onto the analog communication link of the analog output stream including the analog reference level data.

21. The apparatus of claim 15 wherein the transmitter means (FIG. 7) comprises:
   means (151, 155, 160, 152, 154), coupled to the serializer means, for inserting a digital reference position into the N-bit stream after each predetermined number of N-bit words, wherein the predetermined number is greater than 1;
   first means (165), coupled to the means for inserting, for converting the first N-bit stream into an analog data output stream;
   second means (164), coupled to the means for inserting, for converting the first N-bit stream into an analog reference output stream, responsive to the digital reference position such that the analog reference output stream has a first value at the digital reference position and a second value at other positions in the first N-bit stream; and
   means (166, 167), coupled to the first and second means for converting, for combining the analog data output stream and analog reference output stream for transmission onto the analog communication link.

22. The apparatus of claim 15 wherein N is 8 such that each N-bit word comprises 1 byte, wherein each of the first plurality of N-bit streams may have a rate of at least 31.25 Megabytes per second, wherein the communication link is adapted to transmit analog data at a frequency of at least 1 GigaHertz, and wherein:
   the serializer means time-multiplexes the first plurality of N-bit streams, and provides the first N-bit stream a rate of at least 125 Megabytes per second; and
   the transmitter means includes an N-bit digital to quasi-analog converter which accepts the first N-bit stream at a rate of at least 125 Megabytes per second and generates the first analog stream such that the first analog stream includes quasi-analog pulses at a frequency of at least 125 Megahertz, wherein each of the quasi-analog pulses represents one byte, whereby the first analog stream transmits data at an effective rate of at least 1 GigaHertz.

23. The apparatus of claim 15 wherein, at a given moment, the first analog stream comprises an analog value, wherein the analog value is either;
   one of a plurality of analog data value levels, each analog data value level representing a corresponding digital value in the first N-bit stream; or
   an analog reference level facilitating regeneration of the first N-bit stream from the first analog stream.

24. An apparatus (FIG. 4) receiving a series of multibit data words and a conversion clock signal having cycles, wherein the apparatus comprises:
   input means (43), having an input and an output, for receiving at the input the series of multibit data words, and for presenting at the output a next multibit data word of the series in response to the conversion clock;
   intensity means (46, 47), having an input coupled to the output of the input means, for applying a digital intensity reference to each said next multibit word, and having an output at which to accordingly present a series of multibit intensity-referenced words;
   clocking means (53) for generating a reference signal after each $N^{th}$ conversion clock signal cycle, where N is a prespecified integer greater than 1;
   means (49), coupled to the intensity means and to the clocking means, for inserting a multibit reference word into the series of multibit intensity-referenced words at each reference signal; and
   means (54, 57), coupled to the means for inserting and to receive the conversion clock signal, for converting the series of multibit intensity-referenced words and reference words into an analog output signal.

25. An apparatus (FIG. 6) receiving a series of multibit data words and a conversion clock signal having cycles, wherein the apparatus comprises:
   input means (101), having an input and an output, for receiving at the input the series of multibit data words, and for presenting at the output a next multibit data word of the series in response to the conversion clock signal;
   intensity means (109, 108), having an input coupled to the output of the input means, for applying a digital intensity reference to each said next multibit word, and having an output at which to present a series of multibit intensity-referenced words;
   means (112, 116), coupled to the output of the intensity means, for converting the series of multibit intensity-referenced words into an analog data signal;
   clocking means (105) for generating a reference signal after each $N^{th}$ conversion clock signal cycle, where N is a prespecified integer greater than 1; and
   means (107), coupled to the intensity means and to the clocking means, for inserting an analog reference value into the analog data signal at each reference signal, to form an analog output signal.

26. An apparatus (FIG. 7) receiving a series of multibit data words and a conversion clock signal having cycles, wherein the apparatus comprises:
   input means (151), for receiving the series of multibit data words, and for presenting a next multibit data word of the series in response to the conversion clock signal;
   clocking means (155) for generating a reference signal after each $N^{th}$ conversion clock signal cycle, where N is a prespecified integer greater than 1;
   means (162, 159), coupled to the input means and the clocking means, for presenting said next multibit data word when said reference signal is not generated, and for presenting a multibit reference word when said reference signal is generated;
   means (165), coupled to the means for presenting, for converting a multibit data or reference word from the means for presenting into an analog data signal; and
   means (164, 166, 167), receiving a signal representative of the reference signal, for combining a reference current with the analog data signal when the reference signal is generated, to form an analog output signal including reference pulses.

27. An apparatus (FIG. 5) receiving an analog input signal having analog reference pulses between pluralities of analog data pulses, wherein a data pulse has one of a predetermined number of values, and wherein the apparatus comprising:
   means (78, 79), receiving the analog input signal, for generating a clocking signal (CLOCK, SYNC GATE) according to the reference pulses, the clocking signal having cycles one per data pulse; and means (77, 83, 85), receiving the analog input signal and coupled to the means for generating, for converting a data pulse to a digital multibit word according to a value of the data pulse, in response to the clocking signal, whereby the apparatus converts the analog input signal to a series of multibit data words corresponding to the data pulses without words corresponding to the reference pulses.

* * * * *